US012718630B2

(12) United States Patent
Smith

(10) Patent No.: US 12,718,630 B2
(45) Date of Patent: Aug. 25, 2026

(54) ADAPTABLE HARDWARE INTERFACE FOR DEVICE TESTING USING A ROLLING TEST BENCH

(71) Applicant: Toyota Jidosha Kabushiki Kaisha, Toyota Aichi-ken (JP)

(72) Inventor: Joshua S. Smith, Livonia, MI (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 107 days.

(21) Appl. No.: 18/810,108

(22) Filed: Aug. 20, 2024

(65) Prior Publication Data

US 2026/0057710 A1 Feb. 26, 2026

(51) Int. Cl.
*G07C 5/00* (2006.01)
*G07C 5/08* (2006.01)

(52) U.S. Cl.
CPC ........... *G07C 5/008* (2013.01); *G07C 5/0808* (2013.01)

(58) Field of Classification Search
CPC .............................. G07C 5/008; G07C 5/0808
See application file for complete search history.

(56) References Cited

U.S. PATENT DOCUMENTS

| | | | | |
|---|---|---|---|---|
| 10,677,687 | B2 | 6/2020 | Pfister et al. | |
| 11,107,308 | B2 | 8/2021 | Mihaltan et al. | |
| 11,954,946 | B1 * | 4/2024 | Herron | G07C 5/0808 |
| 12,241,807 | B2 * | 3/2025 | Zhao | G01M 17/0072 |
| 12,252,141 | B2 * | 3/2025 | Kobayashi | G07C 5/0808 |
| 12,361,772 | B1 * | 7/2025 | Herron | G07C 5/0808 |
| 2002/0018982 | A1 * | 2/2002 | Conroy | G09B 19/16 434/62 |
| 2013/0317775 | A1 * | 11/2013 | Uratani | G01M 17/007 702/113 |
| 2014/0350774 | A1 * | 11/2014 | Mouzakitis | G01R 31/3277 701/29.1 |
| 2015/0338313 | A1 * | 11/2015 | Tanaka | G01M 17/007 701/32.8 |
| 2019/0225235 | A1 | 7/2019 | Schyr et al. | |
| 2021/0111921 | A1 * | 4/2021 | Jiang | H04L 12/40013 |
| 2021/0406562 | A1 | 12/2021 | Holzinger et al. | |
| 2022/0136930 | A1 * | 5/2022 | Zhao | G01M 17/0072 701/32.8 |
| 2023/0047570 | A1 | 2/2023 | Aal | |
| 2023/0100093 | A1 * | 3/2023 | Sauer | G01R 13/02 714/724 |
| 2023/0306159 | A1 * | 9/2023 | Kong | G06F 30/20 |
| 2024/0192283 | A1 * | 6/2024 | Mares | G01R 31/3644 |
| 2025/0208985 | A1 * | 6/2025 | Chen | G06F 11/3684 |

FOREIGN PATENT DOCUMENTS

| | | |
|---|---|---|
| CN | 214585760 U | 11/2021 |

* cited by examiner

*Primary Examiner* — Mohamed A. Wasel
(74) *Attorney, Agent, or Firm* — Christopher G. Darrow; Darrow Mustafa PC

(57) ABSTRACT

Systems, methods, and other embodiments described herein relate to improving the testing of electronic devices using a rolling test bench with adaptable interfaces. In one embodiment, an interface system includes an endpoint interface device connected with a wire harness of a vehicle. The interface system includes a test device connected with the endpoint interface device via a network to control a component of the vehicle attached to the network via the wire harness and the endpoint interface device.

20 Claims, 10 Drawing Sheets

ADAPTABLE HARDWARE INTERFACE FOR DEVICE TESTING USING A ROLLING TEST BENCH

TECHNICAL FIELD

The subject matter described herein relates, in general, to testing electronic devices and, more particularly, to a rolling test bench that implements adaptable interfaces for integrating test devices with a wire harness of a vehicle.

BACKGROUND

Developers implement test benches to provide a controlled environment for developing software for new devices and testing that the new devices function as expected. In general, test benches are built on a per-device basis. As one example, in the context of vehicle electronic control units (ECUs), a test bench may include a custom wire harness that connects various different devices together while also providing additional connections for testing purposes. However, the uniqueness of these test benches requires institutional knowledge to effectively use them, thus limiting the ability for these benches to be shared between many developers and complicating access overall. Moreover, as the complexity of the device or arrangement of devices under test increases and/or testing requirements increase, the wiring harnesses also become more complex and difficult to build and maintain. The increase in complexity also leads to increased costs for a test setup that is not reusable, thereby leading to further waste. Additionally, collecting data about test devices under realistic conditions can be especially elusive with these complex test setups.

SUMMARY

Example systems and methods relate to a rolling test bench that implements adaptable interfaces for integrating test devices with a wire harness of a vehicle. As previously noted, test benches can be complex to implement because of various considerations, including the complexity of the device or devices being tested. This leads to increased costs and waste since these test benches are complex to implement and not typically reusable. Moreover, in addition to their complexity, the test benches are generally stationary arrangements of components that are not integrated within an actual vehicle. As such, obtaining test data from realistic conditions can be hindered.

Therefore, in at least one approach, an inventive system is disclosed that provides an adaptable interface and associated logic connected within a rolling test bench to improve the testing of electronic devices. For example, in at least one aspect, an interface device is comprised of a controller, a memory, a bridge, and a connector for supporting communication with a device under test (i.e., an electronic device). The electronic device may take many different forms, including a module with multiple die packages, a single die package, and so on. As described herein, the electronic device is generally an electronic control unit as may be used within a vehicle. It should be appreciated that while the present disclosure focuses on the context of a vehicle, the disclosed devices, systems, and methods are applicable to other contexts.

In any case, consider that an electronic device, such as an ECU or multiple ECUs, is generally connected using a complex wiring harness when installed within a vehicle. The wiring harness may include a connector for each separate ECU with wiring therebetween. Moreover, within the context of testing, the wire harness may be further implemented to include diagnostic connectors for providing diagnostic signals. However, as noted previously, specifically designing a unique wiring harness for each different configuration of electronic devices that may need to be tested is complex. As such, the interface device resolves this issue by using the bridge to connect with multiple electronic devices under test, such as multiple different ECUs. The bridge connects to a respective electronic device via connector pins that may be separate pins of a device or arranged in a combined connector. The connector pins connect the bridge with an explicit connector port associated with the electronic device being tested (e.g., an ECU) or directly to pins of a die package or other electronic device (e.g., a sensor).

Consequently, the connector pins may be connected with the wire harness for the particular electronic device in a particular manner, but this is in place of a more complex harness that cannot be modified to different arrangements. Because the connections with the wire harness from the connector pins are unique in each instance, the interface further includes a memory, which may be an EEPROM or similar type of non-volatile memory, that stores configuration information about the electronic device and other devices under test that are connected via connector pins to the bridge. The contents of the configuration information may vary by implementation but generally includes descriptive data identifying the electronic device (e.g., serial number or other identifier, version number, etc.) and a mapping of the connector pins with the wire harness. The mapping identifies the correlation of the pins of the electronic device with ports of the bridge on which the pins are connected and exposed for communication. Accordingly, a controller mediates access to the electronic device by communicating the configuration information so that a test server or other test administering device can access the electronic device.

In various arrangements, the rolling test bench includes multiple interface devices to facilitate various connections. For example, the rolling test bench can be implemented within a vehicle in which the normal electronic control units are removed and associated connections within the wire harness of the vehicle are instead connected with endpoint interface devices. The endpoint interface devices are the same as the interface devices that connect with test devices but instead connect with the wiring harness in place of the ECUs. In turn, the endpoint interface devices connect with a communication network (e.g., an Ethernet network) that links to test interface devices via a network switch. Similarly, the test interface devices are simply interface devices that connect with test devices (e.g., ECUs) mounted in the vehicle at, for example, a central mounting location. This provides for easily swapping test devices into the rolling test bench while also providing for dynamically configuring connections to the test devices and the wiring harness of the vehicle. It should be appreciated that the vehicle in which the rolling test bench is implemented is a functional vehicle that replaces the ECUs for controlling different components with the endpoint interface devices. In turn, the endpoint interface devices provide connectivity to the test devices (i.e., ECUs) that are under test via the test interface devices. In this way, the rolling test bench provides a dynamically configurable arrangement for testing ECUs under realistic conditions and further improves testing by avoiding complex, expensive, and potentially wasteful physical harnesses.

In one embodiment, an interface system is disclosed. The interface system includes an endpoint interface device connected with a wire harness of a vehicle. The interface system includes a test device connected with the endpoint interface device via a network to control a component of the vehicle attached to the network via the wire harness and the endpoint interface device.

In one embodiment, an apparatus is disclosed. The apparatus includes an endpoint interface device connected with a wire harness of a vehicle. The apparatus includes a communication network connected with the endpoint interface device. The apparatus includes a test device connected to the communication network via a test interface device to control a component of the vehicle attached to the network via the endpoint interface device. The apparatus includes a test interface device connected between the communication network and the test device. The test interface device and the endpoint interface device are dynamically configurable to bridge connections with the test device and the component onto the communication network.

In one embodiment, a rolling test bench is disclosed. The rolling test bench includes an endpoint interface device connected with a wire harness of a vehicle. The rolling test bench includes a communication network connected with the endpoint interface device. The rolling test bench includes a test device connected to the communication network via a test interface device to control a component of the vehicle attached to the network via the endpoint interface device. The rolling test bench includes a test interface device connected between the communication network and the test device. The test interface device and the endpoint interface device are dynamically configurable to bridge connections with the test device and the component onto the communication network. The rolling test bench includes a control module, including instructions that, when executed by one or more processors, cause the one or more processors to dynamically configure connections via the network between test interface device and the endpoint interface device.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
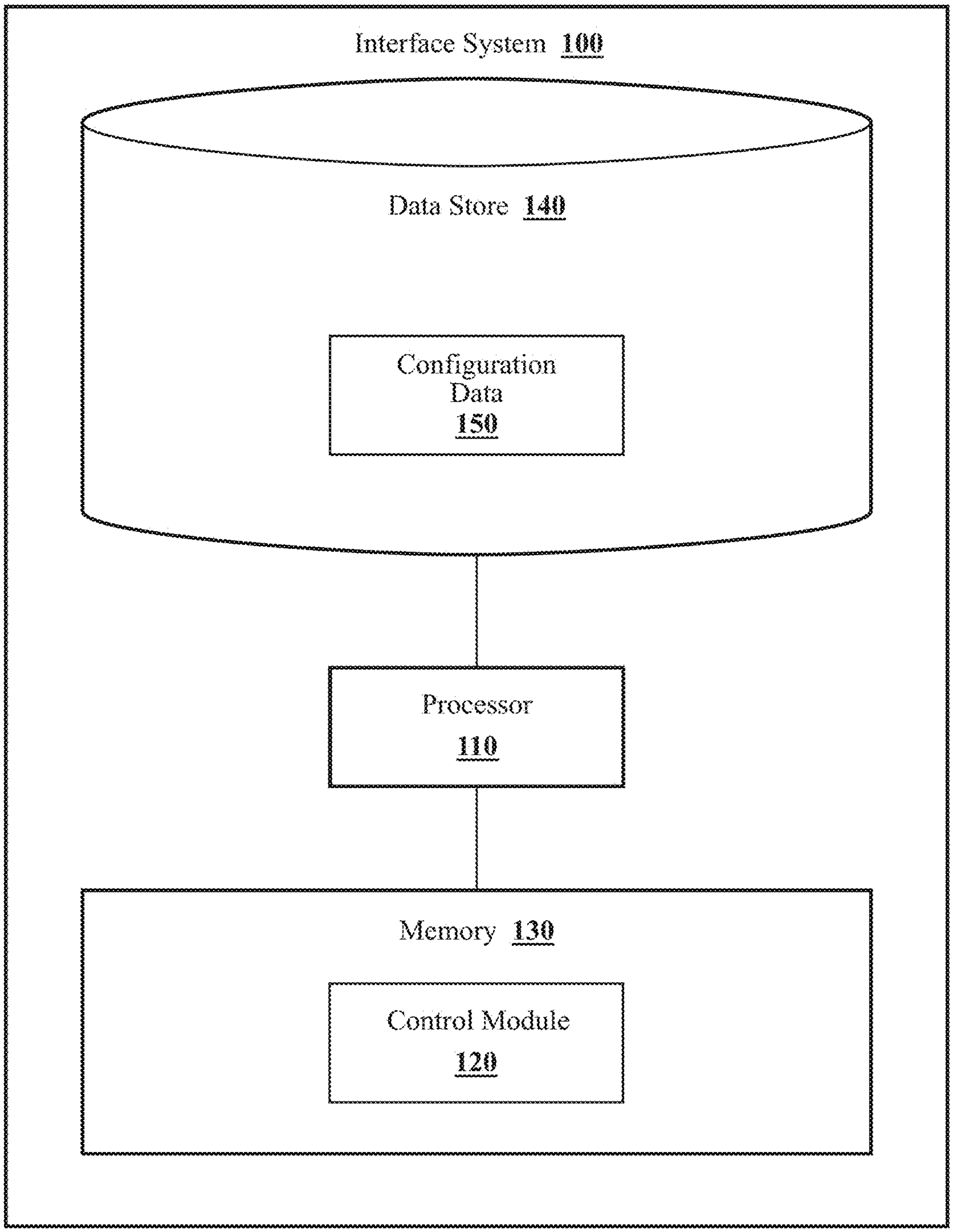
FIG. 1 illustrates one embodiment of an interface system that is associated with an adaptable platform for testing electronic devices.

Systems, methods, and other embodiments associated with a rolling test bench that implements adaptable interfaces for integrating test devices with a wire harness of a vehicle are disclosed. As previously noted, test benches can be complex to implement because of various considerations, including the complexity of the device or devices being tested. This leads to increased costs and waste since these test benches are complex to implement and not typically reusable. Moreover, in addition to their complexity, the test benches are generally stationary arrangements of components that are not integrated within an actual vehicle. As such, obtaining test data from realistic conditions can be hindered.

Therefore, in at least one approach, an inventive system is disclosed that provides an adaptable interface and associated logic connected within a rolling test bench to improve the testing of electronic devices. For example, in at least one aspect, an interface device is comprised of a controller, a memory, a bridge, and a connector for supporting communication with a device under test (i.e., an electronic device). The electronic device may take many different forms, including a module with multiple die packages, a single die package, and so on. As described herein, the electronic device is generally an electronic control unit as may be used within a vehicle. It should be appreciated that while the present disclosure focuses on the context of a vehicle, the disclosed devices, systems, and methods are applicable to other contexts.

In any case, consider that an electronic device, such as an ECU or multiple ECUs, is generally connected using a complex wiring harness when installed within a vehicle. The wiring harness may include a connector for each separate ECU with wiring therebetween. Moreover, within the context of testing, the wire harness may be further implemented to include diagnostic connectors for providing diagnostic signals. However, as noted previously, specifically designing a unique wiring harness for each different configuration of electronic devices that may need to be tested is complex. As such, the interface device resolves this issue by using the bridge to connect with multiple electronic devices under test, such as multiple different ECUs. The bridge connects to a respective electronic device via connector pins that may be separate pins of a device or arranged in a combined connector. The connector pins connect the bridge with an explicit connector port associated with the electronic device being tested (e.g., an ECU) or directly to pins of a die package or other electronic device (e.g., sensor).

Consequently, the connector pins may be connected with the wire harness for the particular electronic device in a particular manner, but this is in place of a more complex harness that cannot be modified to different arrangements. Because the connections with the wire harness from the connector pins are unique in each instance, the interface further includes a memory, which may be an EEPROM or similar type of non-volatile memory, that stores configuration information about the electronic device and other devices under test that are connected via connector pins to the bridge. The contents of the configuration information may vary by implementation but generally includes descriptive data identifying the electronic device (e.g., serial number or other identifier, version number, etc.) and a mapping of the connector pins with the wire harness. The mapping identifies the correlation of the pins of the electronic device with ports of the bridge on which the pins are connected and exposed for communication. Accordingly, a controller mediates access to the electronic device by communicating the configuration information so that a test server or other test administering device can access the electronic device.

In various arrangements, the rolling test bench includes multiple interface devices to facilitate various connections. For example, the rolling test bench can be implemented within a vehicle in which the normal electronic control units are removed and associated connections within the wire harness of the vehicle are instead connected with endpoint interface devices. The endpoint interface devices are the same as the interface devices that connect with test devices but instead connect with the wiring harness in place of the ECUs. In turn, the endpoint interface devices connect with a communication network (e.g., an Ethernet network) that links to test interface devices via a network switch. Similarly, the test interface devices are simply interface devices that connect with test devices (e.g., ECUs) mounted in the vehicle at, for example, a central mounting location. This provides for easily swapping test devices into the rolling test bench while also providing for dynamically configuring connections to the test devices and the wiring harness of the vehicle. It should be appreciated that the vehicle in which the rolling test bench is implemented is a functional vehicle that replaces the ECUs for controlling different components with the endpoint interface devices. In turn, the endpoint interface devices provide connectivity to the test devices (i.e., ECUs) that are under test via the test interface devices. In this way, the rolling test bench provides a dynamically configurable arrangement for testing ECUs under realistic conditions and further improves testing by avoiding complex, expensive, and potentially wasteful physical harnesses.

With reference to FIG. 1, one embodiment of an interface system 100 is illustrated. The interface system 100 is shown as including a processor 110, which may be integrated within the interface system 100 or may be associated with a separate computing device, such as a server, cloud-computing system, and so on. Accordingly, the processor 110 may be a part of the interface system 100, or the interface system 100 may access the processor 110 through a data bus or another communication path. In one embodiment, the interface system 100 includes a memory 130 that stores a control module 120. The memory 130 is a random-access memory (RAM), read-only memory (ROM), a hard-disk drive, a flash memory, or another suitable memory for storing the module 120. The module 120 is, for example, computer-readable instructions that, when executed by the processor 110, cause the processor 110 to perform the various functions disclosed herein. In alternative arrangements, the module 120 is independent from the memory 130 and is, for example, comprised of hardware elements (e.g., arrangements of logic gates). Thus, the module 120 is alternatively an ASIC, a hardware-based controller, a composition of logic gates, or another hardware-based solution.

The interface system 100, as illustrated in FIG. 1, is an abstracted form of the interface system 100 as may be implemented as part of an interface device, an edge service, and/or a cloud-computing system. It should be appreciated that the functionality discussed in relation to the interface system 100 may be wholly retained within a single device, such as the interface device itself, or may be distributed among multiple different devices, such as interface devices, computing elements functioning as edge services, computing elements functioning as cloud services, and so on. As such, the particular arrangement described in relation to FIG. 1 is not intended to be limiting but as an example of how the specific functions described herein may be executed in relation to a computing device.

Figure 2A:
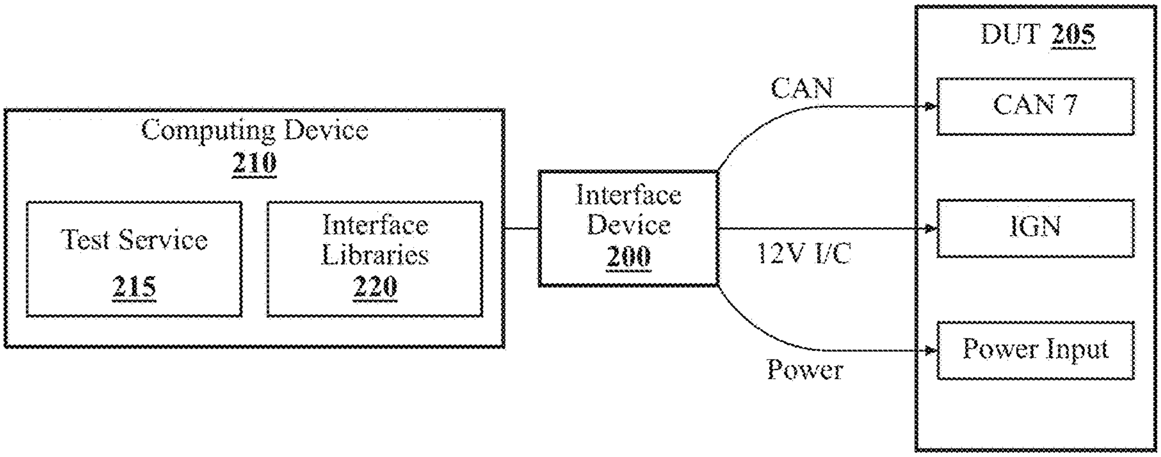
FIG. 2A illustrates one embodiment of an interface device and connected devices.

With reference to FIG. 2A, one example of an interface device 200 (also referred to as a hardware interface (HWI), a test interface device (TID), and an endpoint interface device (EID) herein) is illustrated. As used herein, the separate terms refer to the same device but used within separate roles. That is, the phrase "test interface device (TID)" describes an interface device within the rolling test bench embodiment that connects with controllers being tested in the rolling test bench. By contrast, the term "endpoint interface device (EID)" describes an interface device, as used in the rolling test bench embodiment, that connects with the wire harness of the vehicle in order to provide communications between a test device and the actual components (e.g., actuators, sensors, etc.) of the vehicle. Thus, while the general configuration of the interface device 200 is similar in the separate embodiments, the particular role of the interface device may change.

The interface device 200, as shown in FIG. 2A, connects with a device under test (DUT) 205. The DUT 205 may, in general, be any electronic device that is being tested, such as an ECU, or other electronic module. The interface device 200 connects with the DUT 205 via connector pins that is specific to the DUT 205. As illustrated in the present example, the connector pins include three primary connections that may be comprised of multiple separate wires each. In particular, the DUT 205 is connected via a control area connection (CAN), a 12 V I/O, and a power line. These separate portions of the connector pins interface with a CAN port, and IGN port, and a power input, respectively. Thus, as can be appreciated from the present example, the connector pins for each separate DUT may be unique to that DUT and is, therefore, implemented, in at least one arrangement, on a per-device basis. As an additional aspect, while the interface device 200 is shown in FIG. 2A as connecting with a single DUT 205, in various arrangements, the interface device 200 is capable of connecting multiple separate DUTs. The number of devices to which the interface device 200 connects is generally only limited by attributes of hardware included within the interface device 200 itself, such as a communication bridge that may have a certain number of ports within which to connect.

Separately, the interface device 200, in the illustrated example, connects with a computing device 210. The computing device 210 is, in one or more configurations, a server, a desktop computer, a laptop, or another device that is capable of executing instructions for testing the DUT 205 and communicating via the interface device 200. The computing device 210 executes a test service 215 that includes instructions for testing the DUT 205. For example, the test service 215 may include instructions to provide automated testing and/or a manual interface to the DUT for manual testing. The testing may take different forms depending on the particular use, but can include diagnostics testing, development of software for use on the DUT 205, debugging, and so on.

Figure 2B:
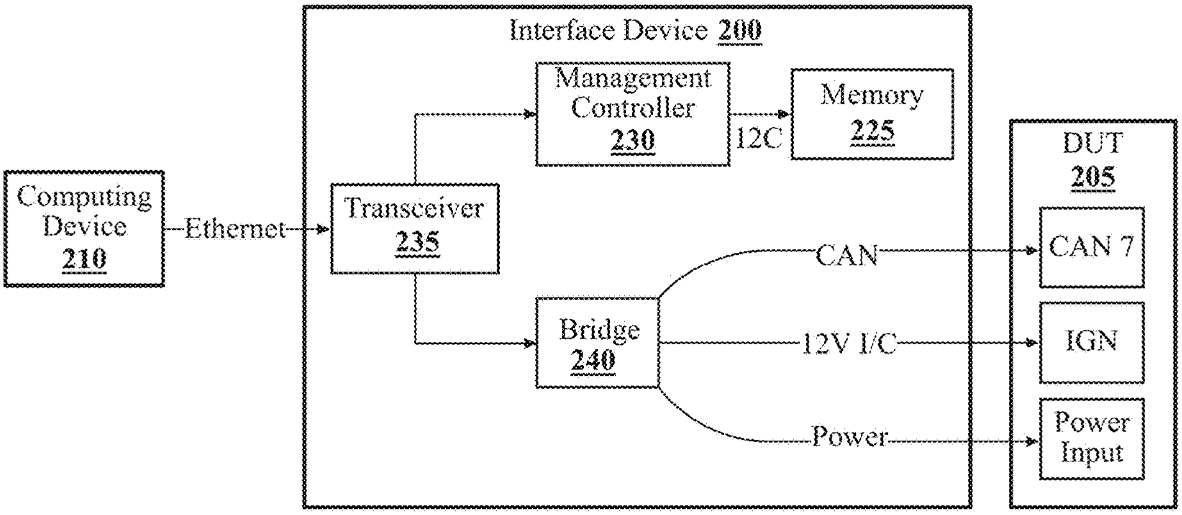
FIG. 2B illustrates one embodiment of the interface device of FIG. 2A with additional details illustrated.

In any case, the test service 215 uses interface libraries 220 to provide for interfacing with the interface device 200 and the DUT 205. That is, the interface libraries 220 may form an application program interface (API) or other software library that provides functions for facilitating communications between the computing device 210 and the interface device 200 over an Ethernet connection or other electronic communication link. For further details of the interface device 200, consider FIG. 2B, which shows additional components of one example of the interface device 200 of FIG. 2A. As illustrated, the interface device 200 includes a memory 225, a management controller 230, a transceiver 235, and a bridge 240.

The transceiver 235 provides for communicating over an Ethernet connection or other communication link with the computing device 210 and may further route communications within the interface device 200 itself. For example, depending on the request provided by the computing device 210 via the interface libraries 220, the transceiver 235 may route the communication to the management controller 230 or directly to the bridge 240. The management controller 230 may be an ASIC, logic, or other programmable processing device that handles initialization requests from the computing device 210 or another external device. For example, the management controller 230 may receive an initialization request for information about one or more DUTs connected to the interface device 200. In general, the interface device 200 stores configuration information for each DUT that is connected with the interface device 200. The interface device 200 may store the configuration information in the memory 225. The memory 225 is, for example, an EEPROM, or other non-volatile memory.

The configuration information stored in the memory 225 includes information about the DUT 205 and the connector pins that connects the DUT 205 with the bridge 240. The information about the DUT 205 can include a device identifier, version number, and other attributes (e.g., device specifications, such as memory, processing capabilities, etc.). The connector pins information includes a mapping or listing of how the pins of the DUT 205 are connected with the bridge 240. Thus, the pin information correlates the pins to ports of the bridge 240 so that the requesting device (i.e., the computing device 210) can generate a mapping for subsequently powering, controlling, and otherwise communicating with the DUT 205. Accordingly, the test service 215 uses the interface device 200 to build a mapping that provides for routing signals generated by the test service 215 when executing a test program to the appropriate pins of the DUT 205. In general, the mapping defines ports associated with the bridge 240 for communicating signals on particular pins of the DUT 205. In this way, the interface device 200 exposes the DUT 205 for interactions with external devices.

Figure 3:
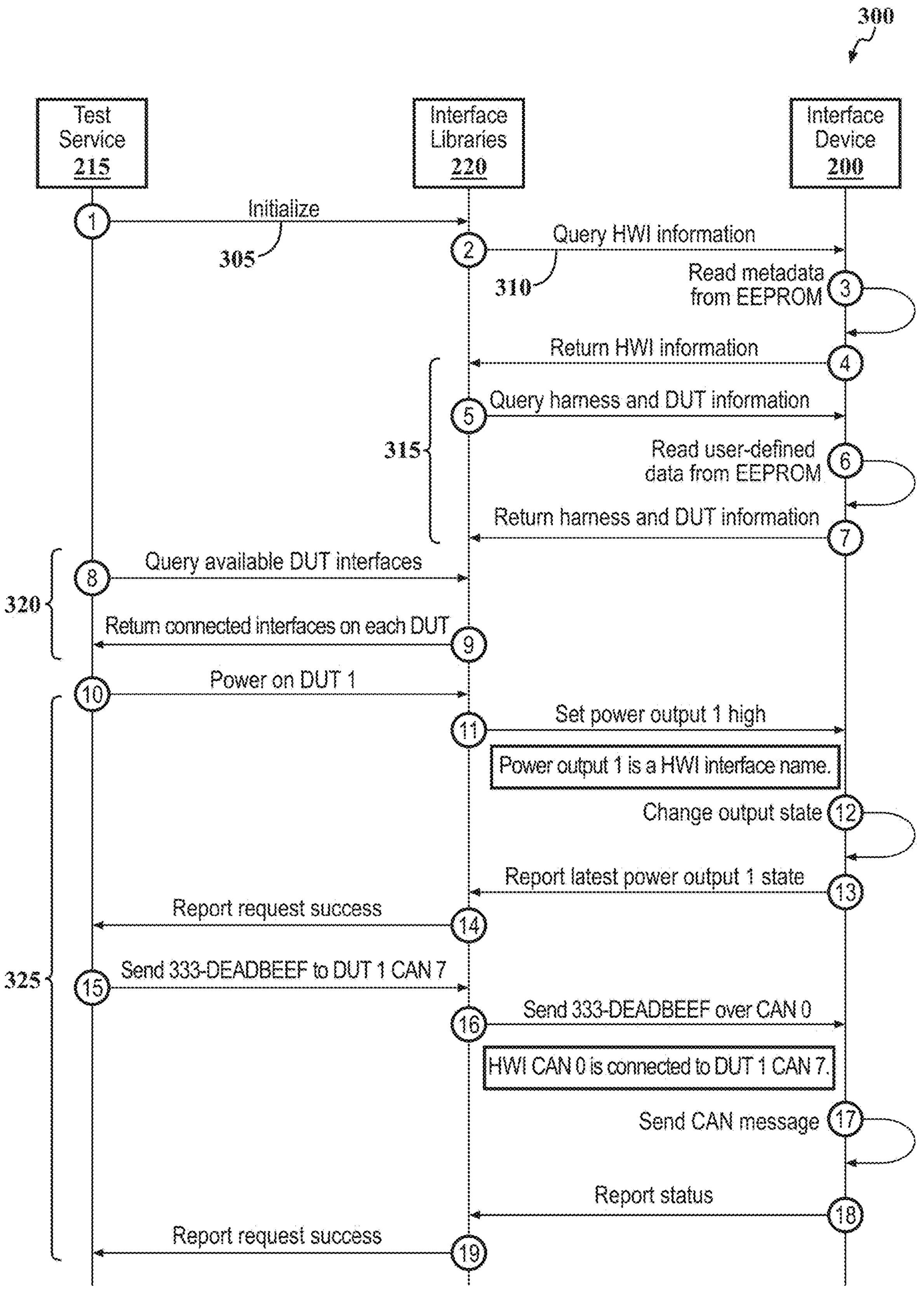
FIG. 3 illustrates a flowchart of communications between an interface device and a test service.

Continuing to FIG. 3, an example 300 of communications between the test service 215, the interface library 220, and the interface device 200 are represented. As additional context, the test service 215 is, in at least one arrangement, an automated testing program that provides a defined set of inputs to the DUT 205 while recording responses in order to characterize the performance of the DUT 205 (e.g., whether the DUT 205 is operating as expected). In further arrangements, the test service 215 may be a development environment for generating software code and loading the software code into the DUT 205 for execution. In still further arrangements, the test service 215 is a manual testing interface that allows a user to select inputs to provide directly to the DUT 205. In yet further arrangements, the test service 215 is a client for interfacing with external requests from remote applications. For example, the test service 215 may interface with an edge service, a cloud-based service, or another entity in order to provide access to the DUT 205 or other attached DUTs of the interface device 200.

In any case, the test service 215 initiates communication with the interface device 200 at 305. In order to provide the communication in the appropriate form, the interface libraries 220, which may be implemented as instructions executing as part of the test service 215, process the request into a query to the interface device, as shown at 310. Responsive to the query, the interface device 200 via the management controller 230 acts to retrieve the configuration information from the memory 225 and communicate the configuration information back to the interface libraries, which is shown as a multistep process at 315. While shown as being retrieved over multiple steps, in various arrangements, the interface device 200 may provide contents of the configuration information in a single communication or in multiple communications depending on, for example, buffer sizes and/or other hardware constraints.

The interface libraries 220 then function to generate the mapping of the pins of the DUT 205 connected with the interface device 200 so that the interface library 220 can translate requests from the test service 215 and communicate the requests on the appropriate ports of the bridge 240. In any case, once the interface libraries 220 function to initialize the mapping, which may be implemented as list, a table, or another data structure that correlates the ports with the pins, the test service 215 is able to query the interface libraries 220 for information about the DUT 205, as shown at 320, such as an identifier, version number, connected pins/interfaces available with the DUT 205, and so on. It should be appreciated that while a single DUT 205 is described, in further arrangements, the information returned from the interface device 200 may include multiple DUTs. Thus, the interface libraries 220 may then function to provide information about multiple separate DUTs. FIG. 3 further illustrates how the test service 215 proceeds to interact with the DUT 205 via the interface device 200. The illustrated communications generally involve powering the DUT 205, communicating with the DUT 205, and acquiring diagnostic information, such as status reports from the DUT 205 via the connected pins.

Figure 4:
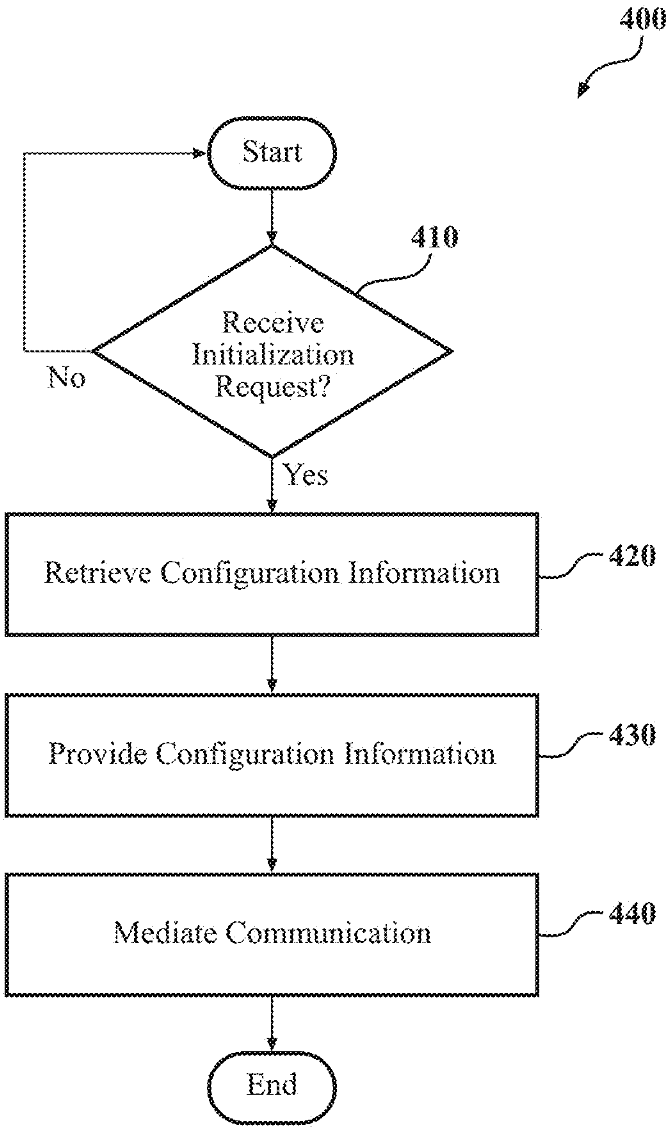
FIG. 4 is a flowchart representing a method associated with using an interface device to mediate communications with a device under test.

Additional aspects of using an interface device to facilitate communications for testing will be discussed in relation to FIG. 4. FIG. 4 illustrates a flowchart of a method 400 that is associated with adaptably interfacing with a device under test (DUT). Method 400 will be discussed from the perspective of the interface system 100 of FIG. 1 with further reference to the interface device 200 of FIGS. 2A-B. While method 400 is discussed in combination with the noted elements, it should be appreciated that the method 400 is not limited to being implemented within the interface system 100 but is instead one example of a system that may implement the method 400.

At 410, the control module 120 monitors for requests from a device connected with the interface device 200. For example, the interface device 200 may connect directly with another device or may connect with a network on which multiple different devices may communicate. In various arrangements, the interface device 200 connects with the network or directly to the other device via an Ethernet cable or other suitable communication link. In any case, the control module 120, which may be implemented, at least in part, as the management controller 230 monitors for communications and identifies or otherwise distinguishes between different communications. In one approach, the control module 120 monitors for a particular flag in the communication or otherwise parses the communication to determine if the communication is an initialization request to access a test device (i.e., DUT) that is connected with the bridge 240. If the communication is an initialization request, then the control module 120 proceeds to retrieve configuration information, as discussed at 420. Otherwise, the control module 120 continues to monitor the communications.

At 420, the control module 120 retrieves configuration information from a memory within the interface device 200. As previously described, the memory 225 stores configuration information for devices connected to the bridge 240 of the interface device 200. Thus, the memory 225 may store a different selection of configuration information depending on how many devices are connected with the interface device. As such, the control module 120, depending on the implementation, may retrieve the configuration information for all of the attached devices or for device(s) specified in the request. Thus, the control module 120 may parse the request to identify attributes of the request, which generally include the DUTs for which information is being requested. Of course, in alternative arrangements, the control module 120 may simply retrieve information for all DUTs for which configuration information is present in the memory 225.

At 430, the control module 120 provides the configuration information in response to the request. That is, the control module 120 (i.e., the management controller 230) communicates the retrieved configuration information to the requesting device via the transceiver 235. As outlined previously, the configuration information includes at least information that permits the requesting device (e.g., a client instance of the control module 120 executing on the computing device 210) to generate a mapping of pins of the test device for communicating with the test device over the network connection. The mapping then functions to facilitate communication with the test device.

At 440, the control module 120 mediates access to the test device(s). That is, for example, the control module 120 via the management controller 230 and the interface libraries 220 functions to control how the communications are routed to the test device(s). In various arrangements, the control module 120 simply leverages the generated mapping to provide communications to a particular DUT. However, in further arrangements, the control module 120 functions to emulate a wire harness. That is, when multiple separate DUTs are connected with the interface device 200 or with multiple interface devices as discussed further subsequently, the control module 120 can emulate a wire harness by directing the communications as though the test devices are wired in the same manner as if a physical wire harness between the test devices was present.

For example, signals generated by one test device (i.e., DUT 205) can be routed to another test device as though the devices are connected via a physical wire harness. However, the control module 120 instead functions to receive and relay the communications. This permits the control module 120 to emulate any configuration of test devices while further collecting diagnostic/analytics data about how the test devices are functioning. Moreover, the control module 120 can further extend an emulated wire harness among multiple interface devices in order to permit more complex arrangements.

Figure 5:
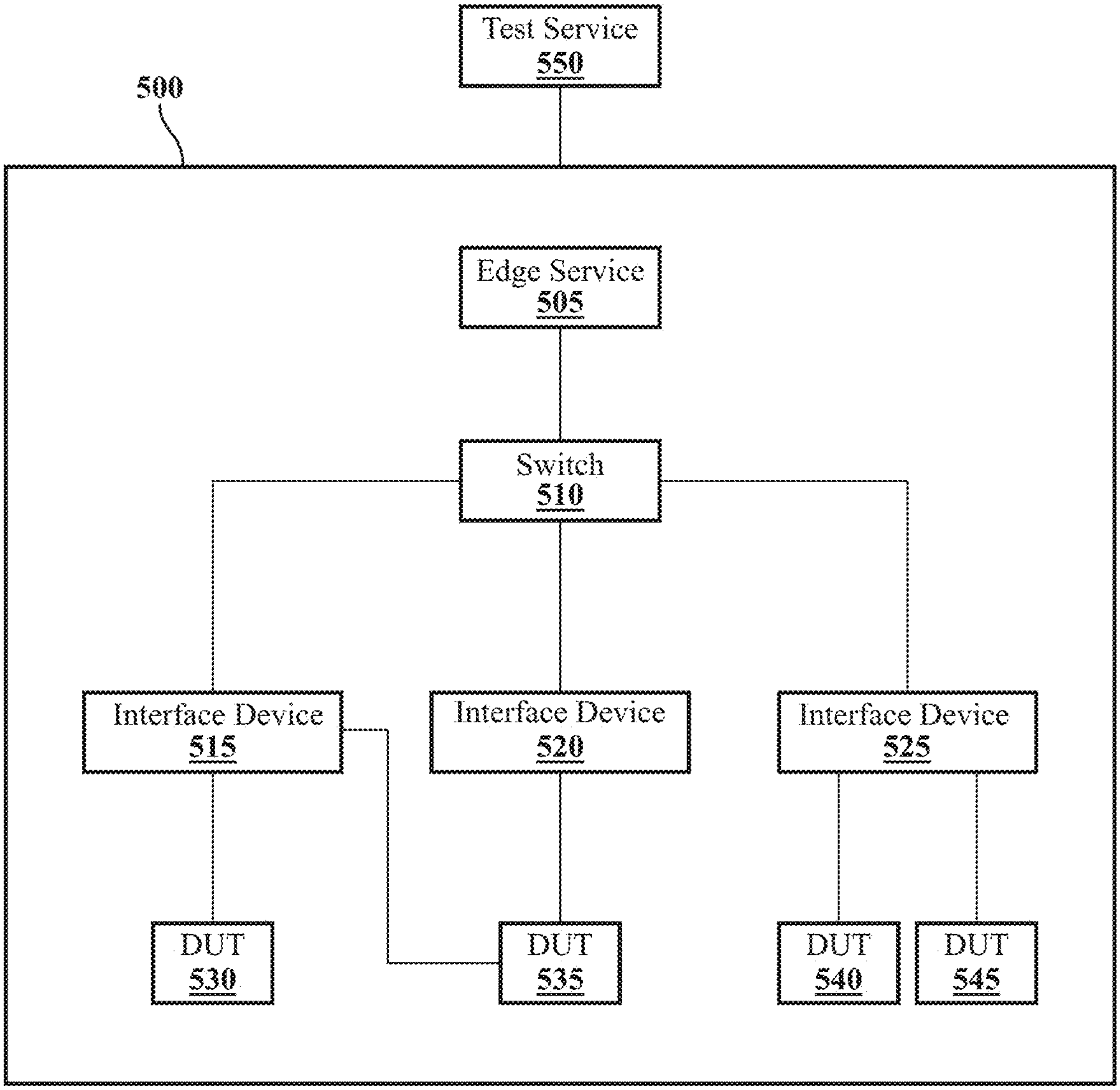
FIG. 5 illustrates one configuration of an edge service that includes multiple interface devices.

In that regard, consider FIG. 5, which illustrates an edge network 500. The edge network 500 is comprised of an edge service 505, which is generally similar to the computing device 210 of FIG. 2, a switch 510, and multiple interface devices 515, 520, and 525. The interface devices are configured in a similar manner as the interface device 200 of FIG. 2. However, as shown in the edge network 500, the arrangement of DUTs 530, 535, 540, and 545 is distinct from the previous example. In particular, the interface devices 515 and 520 are shown as sharing connections with the DUT 535. This example illustrates how the interface devices 515 and 520 are adaptable to different arrangements. In particular, the interface device 515 may provide for connecting with a portion of the pins of the DUT 535 while the interface device 520 may connect with different pins of the DUT 535. This circumstance may arise in different configurations due to, for example, the DUT 535 including more pins than what can be accommodated by a single interface, to split bandwidth between the separate interface devices 520, as a logical division of functions of the DUT 535 for improved management by the interface devices, and so on.

As one example, the DUT 535 may be a complex module that includes connections with multiple sensors, such as multiple cameras. Moreover, the DUT 535 may further include processing capabilities, management, and other functionality built into multiple different electronic components included therein. As such, the pins associated with the separate functions or in any combination that is desired can be divided between the two interface devices 515 and 520. In this arrangement, the interface devices 515 and 520 separately include configuration information for the pins connected to each individual device and also, in at least one arrangement, general identifying information (e.g., serial number, version number, etc.) for the DUT 535. In this arrangement, the interface device 515 still services the DUT 530 in the same manner as previously described. Accordingly, the ability to split the pins between separate interface devices provides additional flexibility in emulating a wire harness.

The edge network 500 provides for the edge service 505 managing the interface devices 515, 520, and 525. That is, the edge service 505 may function to aggregate information from the interface devices 515-525 in order to simplify access on the part of a test service 550. The test service 550 may be a remote client instance that communicates with the edge service 505 in order to perform automated tests and/or other functions on the DUTs 530-545 either individually or in a particular arrangement (e.g., via an emulated wire harness). Thus, the edge service 505 can be configured to perform various management functions, including implementing the interface libraries 220. In this way, the edge network 500 provides for implementing more complex arrangements of DUTs and also provides access to a wider variety of devices. Moreover, devices within an individual edge network are generally co-located, while separate edge networks may be physically distant and located remotely. In various arrangements, a cloud service, which is described in greater detail subsequently, may schedule jobs (i.e., access to particular DUTs to perform testing) within a single edge network, as opposed to spanning multiple edge networks, when feasible. This may provide for executing multiple copies of a test on separate edge networks in parallel. Of course, in further arrangements, virtual wire harnesses can be implemented, and tests performed in configurations that span multiple edge networks.

Figure 6:
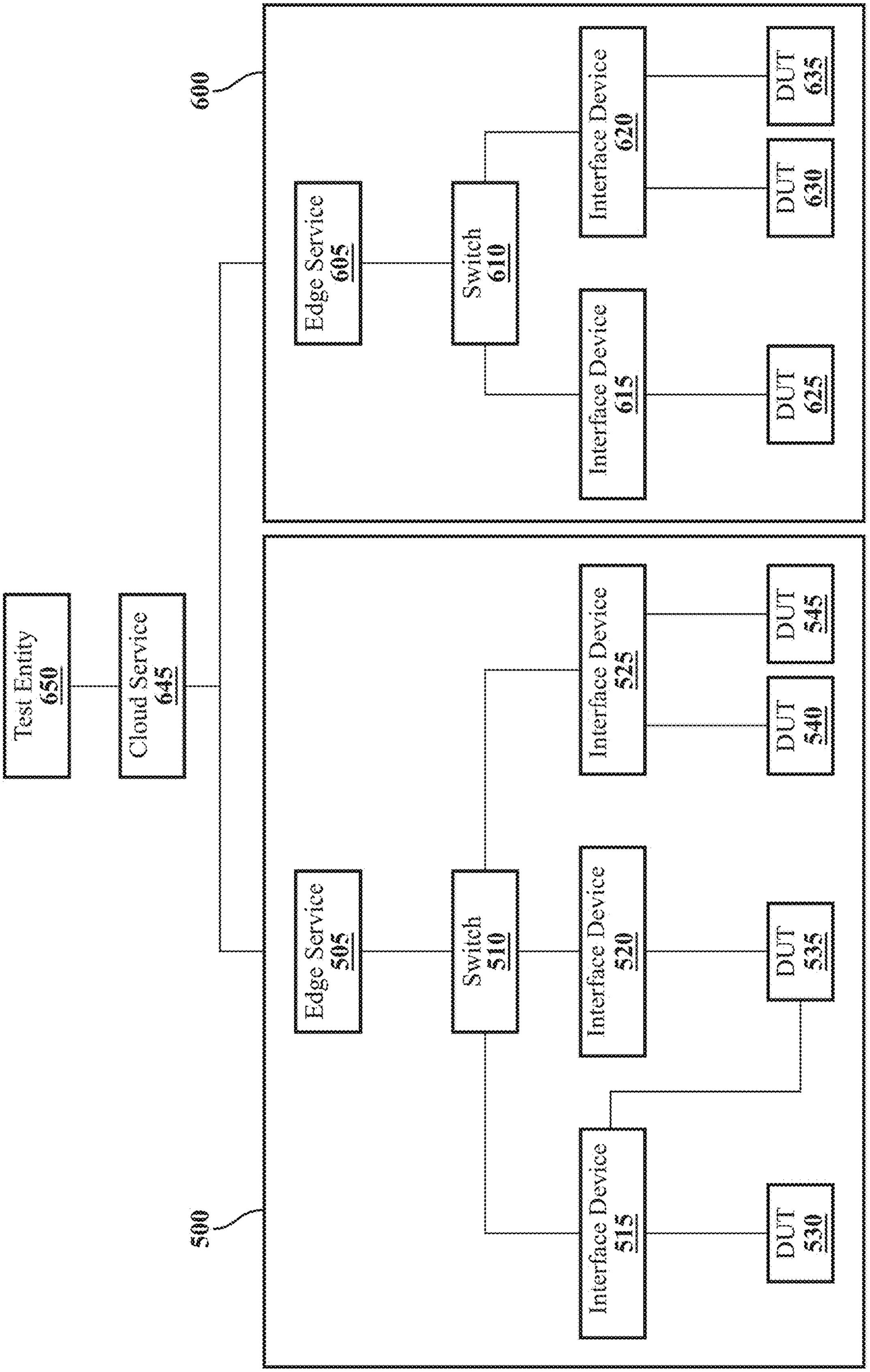
FIG. 6 illustrates one configuration of a cloud-based service that utilizes interface devices to provide emulation of physical wire harnesses.

Continuing further with additional implementations of edge services, consider FIG. 6. FIG. 6 illustrates an example implementation of a cloud-based arrangement. As shown in FIG. 6, the edge network 500 functions in parallel with an additional edge network 600. In general, the overall configuration of the edge networks 500 and 600 is similar, except that the number of interface devices and the attached DUTs may vary depending on the particular implementation. For example, the edge network 600 is shown with an edge service 605 and a switch 610, which is similar to the edge network 500. However, the edge network 600 includes two interface devices 615 and 620 with associated DUTs 625, 630, and 640. In further examples, the number of interface devices per edge network may vary to include more or fewer as well as including more or fewer DUTs.

Additionally, a cloud service 645 is shown connected with the edge networks 500/600. The cloud service 645 may provide connections with more or fewer edge networks than shown in the present example. It should be appreciated that the present example is shown for illustrative purposes and should not be construed as limiting the overall structure. In any case, the cloud service 645 further functions to aggregate information about the DUTs within the connected interface devices of the networks 500/600. The cloud service 645 may be a service executing within a cloud-based device (e.g., a computing server) that is connected with a wide area network, the Internet, or another network for providing communications between remote devices. As such, the cloud service 645 functions to provide access to the DUTs via the connected networks and may further provide additional functions. For example, the cloud service 645 may provide reservations for accessing the DUTs, automatic interface, DUT, and emulated harness registration for access by remote clients, statistics/analytics reporting, native interface bridging, and so on.

In further arrangements, the cloud service 645 provides for bridging together the interfaces from the separate networks to emulate a wire harness. Stated otherwise, the cloud service 645 aggregates the information from the separate interface devices dispersed across the separate edge networks (e.g., 500 and 600) and can form a virtual wire harness between selected ones of the available DUTs. The cloud service 645 provides access for a test entity 650 that may include automated tests, developers, and/or other networked entities. In general, the cloud service 645 provides additional layers of functionality on top of the interface devices and the edge services, as previously described.

As one example, the cloud service 645 can provide access for the test entity 650, which may be a testing device executing testing software that supports hardware-in-loop (HILS), software-in-loop (SILS), simulated electronic control units (ECUs) connected via a virtual wire harness, and so on. Thus, the cloud service 645 can provide access to the DUTs 530-545 and 625-635 and/or virtual/emulated wire harnesses, including the DUTs 530-545 and 625-635. As such, the test entity 650, in one or more approaches, uses the cloud service 645 to form more complex virtual wire harnesses that can include emulated entities (e.g., ECUs) and can also provide access for various software routines. In this way, the cloud service 645 provides interface bridging that enables complex test bench setups and multiple interconnected ECUs to be dynamically provisioned without physical vehicle wire harnesses. Thus, instead of implementing a single large test bench with many ECUs connected via physical wiring, each separate ECU can be installed as a DUT in a server rack associated with an interface device and can be dynamically connected via an emulated wire harness to other ECUs, thereby providing for rapid testing across many different wire harnesses or vehicle variants.

Moreover, the cloud service 645 accepts and manages reservations for a set of DUTs (e.g., ECUs). In general, the cloud service 645 queues requests for jobs (e.g., testing) such that usage of the separate DUTs at the different edge networks managed by the cloud service 645 are maximized. Once a reservation sis granted, the cloud service 645 manages access for a requesting party to one or more edge services so that the requesting party can connect with interfaces and route traffic to and from the interfaces. The cloud service 645 may implement this service in different forms. For example, in a first approach, the cloud service 645 arranges for an associated edge service to bridge all traffic between the requesting party and the DUT (e.g., ECU) via a GRPC or other remote session protocol. The edge service is then enabled to fully control the connection to prevent malicious actors from accessing the ECU without a reservation. In a separate approach, the cloud service 645 manages the edge service to provide routing services (e.g., as an IP address and port), then the requesting party can directly connect to the ECU with the IP address and port information.

Figure 7:
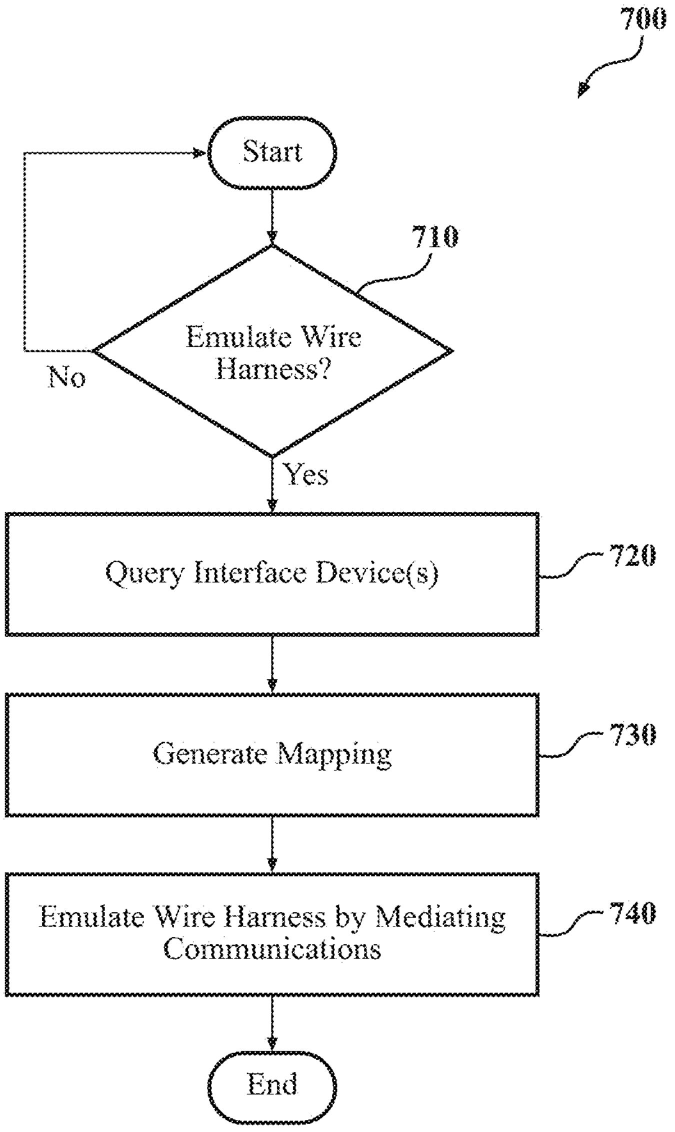
FIG. 7 is a flowchart illustrating a method associated with emulating a wire harness.

Additional aspects of using an interface device within a cloud services context will be discussed in relation to FIG. 7. FIG. 7 illustrates a flowchart of a method 400 that is associated with emulating a wire harness. Method 700 will be discussed from the perspective of the interface system 100 of FIG. 1 with further reference to the cloud service 645 of FIG. 6. While method 700 is discussed in combination with the noted elements, it should be appreciated that the method 700 is not limited to being implemented within the interface system 100 but is instead one example of a system that may implement the method 700.

At 710, the control module 120 monitors for requests from a device. The device may be the test entity 650, the test service 550, or another computing entity (e.g., a test server) that is attempting to access one or more DUTs. In particular, the request, in at least one arrangement, is in regards to emulating a wire harness. As described herein, emulating a wire harness or, stated otherwise, provisioning a virtual wire harness involves mapping available DUTs connected via interface devices to a network and routing communications therebetween according to virtual associations defined by the emulated wire harness.

Accordingly, the request may indicate a form of the wire harness and different DUTs that are to be connected. As such, the control module 120, which may execute as a client instance as part of the cloud service 645, monitors for the requests via a communication link. Once received, the control module 120 proceeds to perform additional functions in support of emulating the wire harness. Otherwise, the control module 120 proceeds with monitoring at 710.

At 720, the control module 120 queries the interface device(s). In at least one approach, the control module 120 provides queries to each separate interface device to retrieve configuration information for the multiple test devices (i.e., DUTs) that are to be virtually connected via the wire harness. In a further arrangement, the control module 120 instead queries edge services (e.g., 505, 605), which can store aggregated information from the interface devices about available DUTs. In any case, the control module 120 queries the respective entities and aggregates the configuration information in response. As previously noted, the configuration information includes information about the respective DUT (e.g., part number, serial number, etc.) and further includes information about the ports of the bridge to which the pins of the DUT are connected, which provides for facilitating communication with the DUT.

At 730, the control module 120 generates a harness mapping that identifies connections through respective interface devices. In particular, the control module 120 uses the configuration information acquired from the interface devices to define correlations between the DUTs via the port-to-pin correlations. That is, the control module 120, in one arrangement, generates a table, such as a routing table, that indicates which pins should provide signals to other specific pins of different DUTs as would be connected with a physical wire if the harness was physically connected. However, because the harness is being emulated and is virtual, the connections are represented through the harness mapping, which may take the form of a routing table. In this way, the control module 120 is able to emulate any arrangement of devices by simply providing a specific routing configuration between the pins of the devices under test.

At 740, the control module 120 emulates the wire harness. As previously described, the emulation may be performed at the cloud service 645 or the edge service (e.g., 505 or 605). In general, the service that provides the emulation simply permits a different scope of interaction with different interface devices. In particular, the cloud service 645 permits access across multiple edge networks while the edge service is limited to the interface devices connected within the particular network. In any case, the control module 120 can have separate instances executing within the different services to provide for the emulation functionality. Thus, the control module 120 uses the harness mapping to mediate communications between the separate DUTs that are included within a virtual wire harness. In one or more approaches, mediating the communications includes the control module 120 routing signals between the DUTs according to the harness mapping. Thus, the control module 120 identifies the source of the communication (i.e., a particular signal from a particular DUT) and routes the signal to one or more other DUTs according to the harness mapping. In this way, the interface system 100 is able to emulate a wire harness and provide an adaptable test bench environment that overcomes the limitations of physical arrangements.

Figure 8:
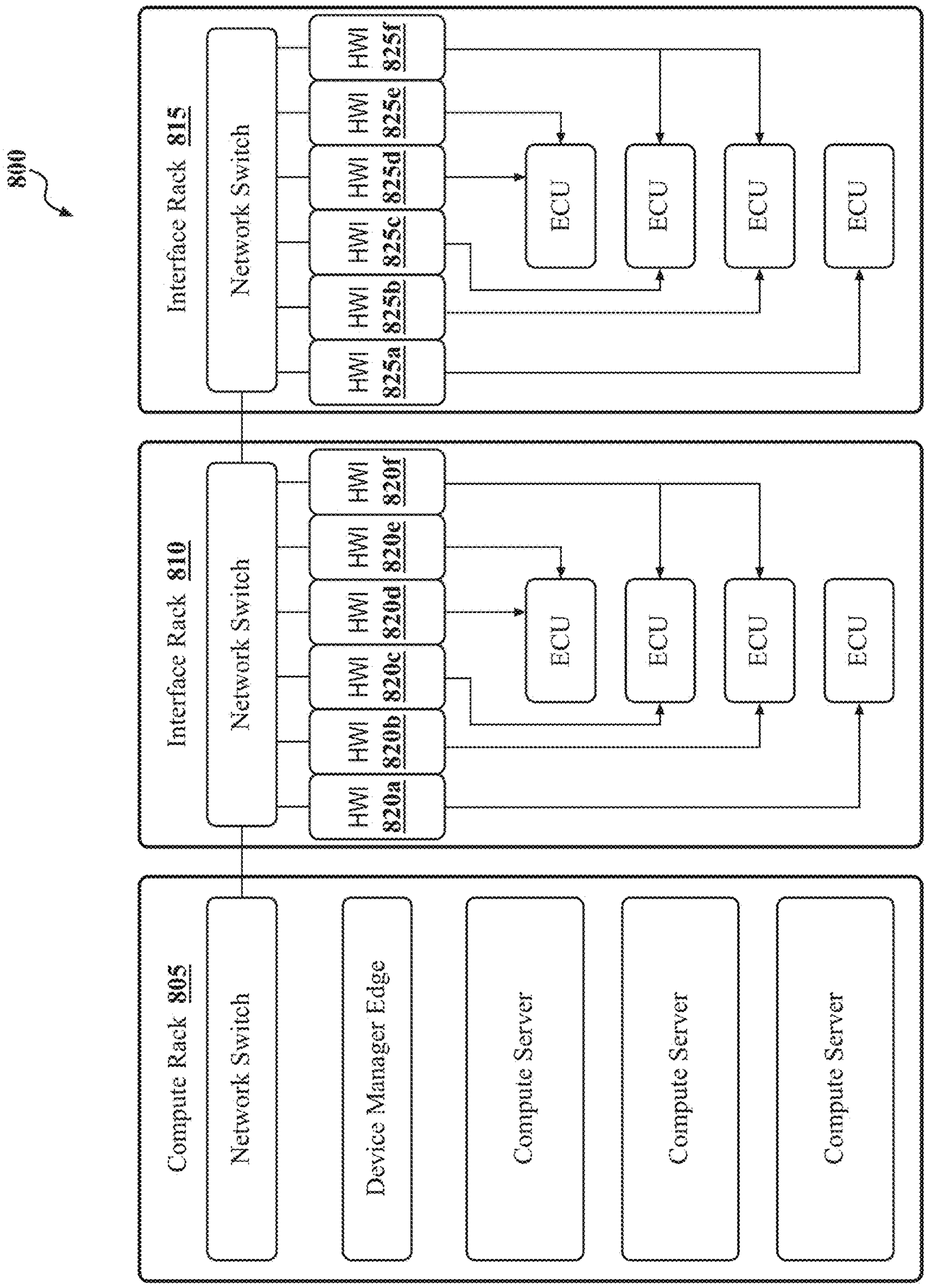
FIG. 8 is a diagram illustrating one arrangement of a rack system that houses multiple networks of interface devices.

With reference to FIG. 8, one example of a rack system 800 is illustrated as it may be installed within a server. In particular, the rack system 800 is comprised of three primary elements, including a compute rack 805, an interface rack 810, and an interface rack 815. The compute rack 805 includes a network switch to connect with a network to which the other racks 810 are also connected. The compute rack 805 further includes multiple compute servers and a device manager edge. The compute servers may execute various instances of the interface system 100 and/or different test services (e.g., test service 215, test service 550, test entity 650). Thus, the automated test programs and other software that may interact with the interfaces can be executed on the compute rack 805. The interface racks 810 and 815 have similar configurations that include network switches to connect with the network and communicate with the compute rack 805. To the network switches, the interface racks 810 connect multiple interface devices, which are labeled ID 820_a-f_ and 825_a-f_ to associated ECUs that are devices under test. As such, the rack system 800 provides for implementing complex virtual wire harnesses via edge and cloud services executing on the compute rack 805. In this way, the adaptable interfaces (e.g., 820_a-f_, 825_a-f_) improve the testing process by avoiding complexities associated with physical harnesses.

Consider a further example of the compute rack 800 in which the compute rack 800 is integrated within a vehicle as a rolling test bench. In this arrangement, the network switch connects with a plurality of different endpoint interface devices to provide communications between ECUs on the interface racks 810-815 via the interface devices 820_a-f_ and 825_a-f_ to components (e.g., I/O components, sensors, etc.) within the vehicle. In at least one arrangement, the endpoint interface device includes connector pins similar to those of the interface device 200. However, the connector pins of the endpoint interface device connect with wires of the actual wire harness of the vehicle. Thus, the endpoint interface device is in place of a controller (e.g., ECU) that would otherwise be connected to the wire harness at the location. Accordingly, the endpoint interface device functions as a relay between the actual wire harness of the vehicle that connects with components and other elements (e.g., communication ports, etc.) and the ECUs that are under test within, for example, the rack system 800 mounted in the vehicle.

Figure 9:
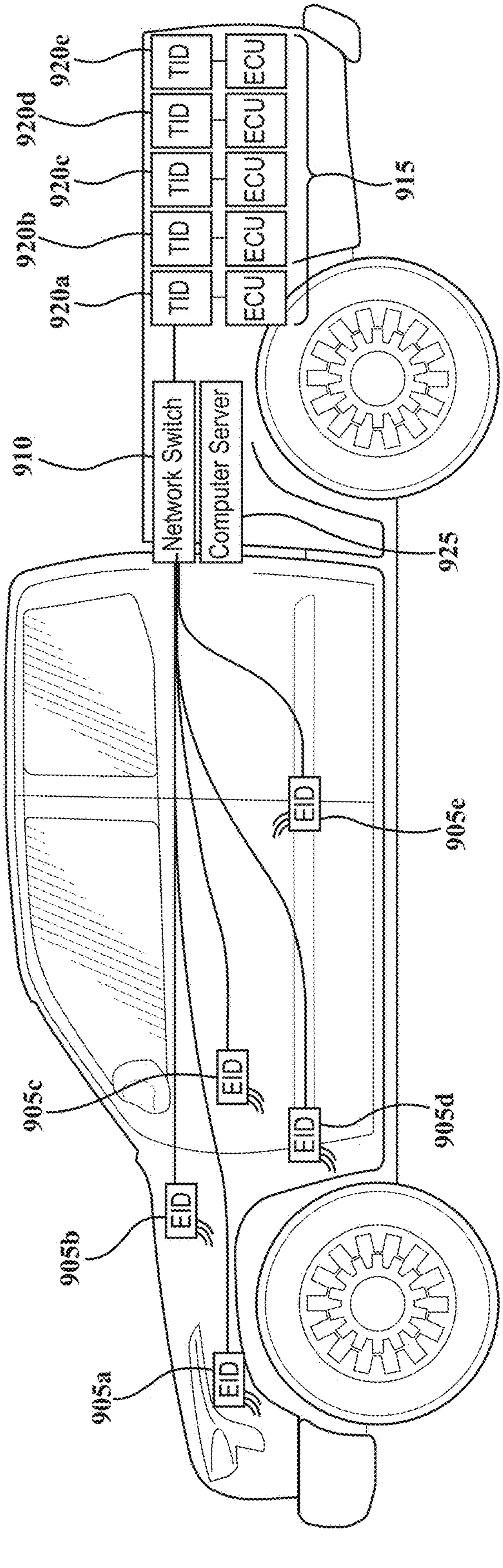
FIG. 9 is a diagram illustrating one example of a rolling test bench.

As further explanation, consider FIG. 9, which is a diagram of a vehicle 900 configured as a rolling test bench. The rolling test bench includes a modified vehicle, such as a truck, sedan, or another configuration of vehicle. In general, the vehicle 900 is modified into the rolling test bench by removing ECUs that would typically be connected to a wire harness (not illustrated) within the vehicle. In place of the ECUs, the vehicle 900 is modified to include endpoint interface devices (EIDs) 905_a-e_. Thus, the EIDs 905_a-e_ have connector pins that instead of connecting to a device under test, such as a test ECU, connect with separate wires of the wire harness to which the ECU would have connected. Thus, the EIDs 905_a-e_ connect with various components of the vehicle 900, such as sensors, I/O devices (e.g., displays, HMI elements, etc.), engine components, actuators (e.g., window actuators, door lock actuators, etc.), and so on via the wire harness. In general, the EIDs 905_a-e_ function to relay communications between a communication network connected to the EIDs 905_a-e_ and the components. The communications on the communication network are, for example, provided over a network switch 910 and may originate from test ECUs 915.

The test ECUs are test devices similar to those described in relation to the interface device 200. Similarly, test interface devices 920_a-e_ are similar to the interface device 200. Accordingly, the TIDs 920_a-e_ provide for connecting the ECUs 915 with the communication network via the network switch 910 so that the ECUs 915 can send and receive signals with components of the vehicle 900 as though the ECUs 915 were installed at locations of the EIDs 905_a-e_. Moreover, the compute server 925 can also function to interact with the EIDs and the TIDs. That is, in one or more arrangements, the compute server 925 includes instructions to emulate virtual devices, such as virtual ECUs. Thus, the compute server 925 may emulate the virtual device and provide communications between the virtual device and the EIDs via the network switch 910. Emulating the virtual device, in this way, permits the compute server to test many different configurations of controllers without the need for a physical version of the ECU. The compute server 925 may further, in one or more arrangements, perform additional functions in relation to the rolling test bench, such as data logging, test execution, and so on. These and other features will become more apparent with the further discussion of the rolling test bench.

Returning to the configuration of the TIDs 920_a-e_, the each TID is configured with a bridge, transceiver, management controller and memory similar to the configuration of the interface device 200 that was previously described. Accordingly, the memory within the TID (e.g., TIDs 920) stores the configuration information of the connector pins with the associated device under test (i.e., ECU). This permits the separate TIDs 920 to be connected with different ECUs that can be swapped into the rolling test bench as needed. Moreover, the connections between the TIDs 920 and the EIDs can also be dynamically configured to support different arrangements of test devices, including virtual devices that can be emulated via the compute server 925. Accordingly, the TIDs 920 are dynamically configurable along with the EIDs 905 to support adaptations in the arrangement of connections and the inclusion of different virtual and real test devices within the test bench. It should be appreciated that the configuration information included within the memory of the TIDs 920 and the EIDs 905 supports dynamic mapping of the connector pins to different ports of the bridge to provide for different arrangements of connections between test devices and the EIDs and/or between the test devices themselves.

To dynamically configure the connections, a control module, which may be located within a TID, an EID, and/or the compute server 925 maps pins of an EID connected with individual wires of the wire harness to ports a network bridge in the EID and also maps pins of test interface device connected with pins of the test device to ports for communicating on the network via the test interface device. The control module associates the separate ports, thereby linking the ECU of the TID with the EID and, thus, particular wires of the wire harness. Thus, the control module can generate separate mappings within the respective interface devices that provide for porting communications on the communication network between specific devices.

Moreover, separate elements of the rolling test bench can further facilitate additional functionality, such as data logging, replay, and specific routing approaches. For example, the control module as implemented within the TIDs, EIDs, and/or compute server 925 can function to log data that is provided onto the communication network. In one or more arrangements, logging the data includes timestamping the data at a point of origin, which may be according to a master clock. Thus, the separate devices (i.e., EID, TID, compute server, network switch, etc.) are, in general, tightly synchronized with a master clock. This process of synchronizing may include implementing a particular protocol, such as generic Precision Time Protocol (gPTP) to coordinate the time between the separate devices and ensure the accuracy of the timestamping. The compute server 925 may function as the log repository, which accepts copies of information forwarded from the network switch 910. The timestamped logs of data can be used to subsequently replay the data provided to the ECUs and/or the wiring harness of vehicle 900 when performing different tests.

Moreover, because the communication network inherently introduces latency between the wiring harness of the vehicle 900 and the devices under test, the timestamps within the logs can be used to identify the latencies and offset the latencies when replaying the data. For example, the control module of the compute server 925 may transmit data on the communication network according to latency by transmitting the data prior to a desired arrival time by the offset that equals the latency. In this way, the compute server 925 is able to replay the data without the latency from the communication network by restructuring the transmission times to influence the reception times such that the ECUs/wiring harness receive the communications as though they are directly connected to the wiring harness.

As a further feature of the rolling test bench, the TIDs and/or the EIDs can be configured in various modes to provide low-latency communications. For example, the interface devices can be configured to perform a pass-through mode. In the pass-through mode, the interface devices have a mapping that causes separate ports within the same device to send and receive data in a loop, thereby locally looping back into the test device or wire harness. This provides a low-latency pass-through while still supporting data logging via the local bridge within the interface device. In this way, the interface devices are able to support low-latency functions for, for example, latency sensitive sensors or other functions within the rolling test bench.

Figure 10:
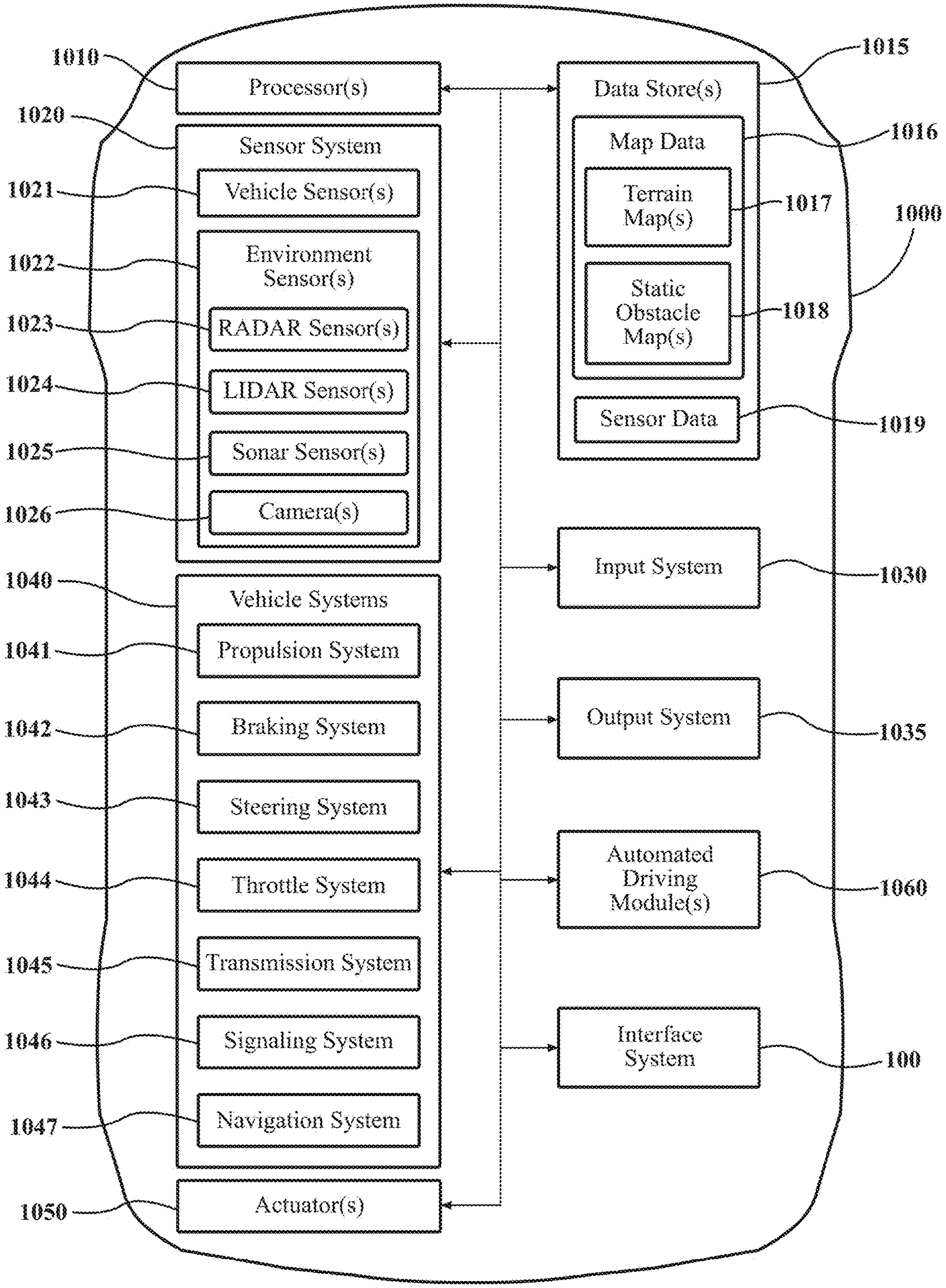
FIG. 10 illustrates one embodiment of a vehicle within which the rolling test bench disclosed herein may be implemented.

Referring to FIG. 10, an example of a vehicle 1000 is illustrated. As used herein, a "vehicle" is any form of transport that may be motorized or otherwise powered. In one or more implementations, the vehicle 1000 is an automobile. While arrangements will be described herein with respect to automobiles, it will be understood that embodiments are not limited to automobiles. In some implementations, the vehicle 1000 may be a robotic device or a form of transport that, for example, includes sensors to perceive aspects of the surrounding environment, and thus benefits from the functionality discussed herein.

The vehicle 1000 also includes various elements. It will be understood that in various embodiments, it may not be necessary for the vehicle 1000 to have all of the elements shown in FIG. 10. The vehicle 1000 can have different combinations of the various elements shown in FIG. 10. Further, the vehicle 1000 can have additional elements to those shown in FIG. 10. In some arrangements, the vehicle 1000 may be implemented without one or more of the elements shown in FIG. 10. While the various elements are shown as being located within the vehicle 1000 in FIG. 10, it will be understood that one or more of these elements can be located external to the vehicle 1000. Further, the elements shown may be physically separated by large distances. For example, as discussed, one or more components of the disclosed system can be implemented within a vehicle while further components of the system are implemented within a cloud-computing environment or other system that is remote from the vehicle 1000.

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the vehicle 1000 includes a interface system 100 that is implemented to perform methods and other functions as disclosed herein relating to improving mapping through synthesizing probe data.

FIG. 10 will now be discussed in full detail as an example environment within which the system and methods disclosed herein may operate. In some instances, the vehicle 1000 is configured to switch selectively between an autonomous mode, one or more semi-autonomous modes, and/or a manual mode. "Manual mode" means that all of or a majority of the control and/or maneuvering of the vehicle is performed according to inputs received via manual human-machine interfaces (HMIs) (e.g., steering wheel, accelerator pedal, brake pedal, etc.) of the vehicle 1000 as manipulated by a user (e.g., human driver). In one or more arrangements, the vehicle 1000 can be a manually-controlled vehicle that is configured to operate in only the manual mode.

In one or more arrangements, the vehicle 1000 implements some level of automation in order to operate autonomously or semi-autonomously. As used herein, automated control of the vehicle 1000 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 1000 along a travel route via a computing system to control the vehicle 1000 with minimal or no input from a human driver. By contrast, the semi-autonomous mode, which may also be referred to as advanced driving assistance system (ADAS), provides a portion of the control and/or maneuvering of the vehicle via a computing system along a travel route with a vehicle operator (i.e., driver) providing at least a portion of the control and/or maneuvering of the vehicle 1000.

With continued reference to the various components illustrated in FIG. 10, the vehicle 1000 includes one or more processors 1010. In one or more arrangements, the processor(s) 1010 can be a primary/centralized processor of the vehicle 1000 or may be representative of many distributed processing units. For instance, the processor(s) 1010 can be an electronic control unit (ECU) that is connected via a TID of the rolling test bench. Alternatively, or additionally, the processors include a central processing unit (CPU), a graphics processing unit (GPU), an ASIC, an microcontroller, a system on a chip (SoC), and/or other electronic processing units that support operation of the vehicle 1000 that can be linked into the wiring harness via TIDs 920 of the rolling test bench.

The vehicle 1000 can include one or more data stores 1015 for storing one or more types of data. The data store 1015 can be comprised of volatile and/or non-volatile memory. Examples of memory that may form the data store 1015 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 1015 is a component of the processor(s) 1010. In general, the data store 1015 is operatively connected to the processor(s) 1010 for use thereby. The term “operatively connected,” as used throughout this description, can include direct or indirect connections, including connections without direct physical contact.

In one or more arrangements, the one or more data stores 1015 include various data elements to support functions of the vehicle 1000, such as semi-autonomous and/or autonomous functions. Thus, the data store 1015 may store map data 1016 and/or sensor data 1019. The map data 1016 includes, in at least one approach, maps of one or more geographic areas. In some instances, the map data 1016 can include information about roads (e.g., lane and/or road maps), traffic control devices, road markings, structures, features, and/or landmarks in the one or more geographic areas. The map data 1016 may be characterized, in at least one approach, as a high-definition (HD) map that provides information for autonomous and/or semi-autonomous functions.

In one or more arrangements, the map data 1016 can include one or more terrain maps 1017. The terrain map(s) 1017 can include information about the ground, terrain, roads, surfaces, and/or other features of one or more geographic areas. The terrain map(s) 1017 can include elevation data in the one or more geographic areas. In one or more arrangements, the map data 1016 includes one or more static obstacle maps 1018. The static obstacle map(s) 1018 can include information about one or more static obstacles located within one or more geographic areas. A “static obstacle” is a physical object whose position and general attributes do not substantially change over a period of time. Examples of static obstacles include trees, buildings, curbs, fences, and so on.

The sensor data 1019 is data provided from one or more sensors of the sensor system 1020, which may be communicated via one or more ECUs via the TIDs. Thus, the sensor data 1019 may include observations of a surrounding environment of the vehicle 1000 and/or information about the vehicle 1000 itself. In some instances, one or more data stores 1015 located onboard the vehicle 1000 store at least a portion of the map data 1016 and/or the sensor data 1019. Alternatively, or in addition, at least a portion of the map data 1016 and/or the sensor data 1019 can be located in one or more data stores 1015 that are located remotely from the vehicle 1000.

As noted above, the vehicle 1000 can include the sensor system 1020. The sensor system 1020 can include one or more sensors. As described herein, “sensor” means an electronic and/or mechanical device that generates an output (e.g., an electric signal) responsive to a physical phenomenon, such as electromagnetic radiation (EMR), sound, etc. The sensor system 1020 and/or the one or more sensors can be operatively connected to the processor(s) 1010, the data store(s) 1015, and/or another element of the vehicle 1000.

Various examples of different types of sensors will be described herein. However, it will be understood that the embodiments are not limited to the particular sensors described. In various configurations, the sensor system 1020 includes one or more vehicle sensors 1021 and/or one or more environment sensors. The vehicle sensor(s) 1021 function to sense information about the vehicle 1000 itself. In one or more arrangements, the vehicle sensor(s) 1021 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 1000.

As noted, the sensor system 1020 can include one or more environment sensors 522 that sense a surrounding environment (e.g., external) of the vehicle 1000 and/or, in at least one arrangement, an environment of a passenger cabin of the vehicle 1000. For example, the one or more environment sensors 1022 sense objects the surrounding environment of the vehicle 1000. Such obstacles may be stationary objects and/or dynamic objects. Various examples of sensors of the sensor system 1020 will be described herein. The example sensors may be part of the one or more environment sensors 1022 and/or the one or more vehicle sensors 1021. However, it will be understood that the embodiments are not limited to the particular sensors described. As an example, in one or more arrangements, the sensor system 1020 includes one or more radar sensors 1023, one or more LIDAR sensors 1024, one or more sonar sensors 1025 (e.g., ultrasonic sensors), and/or one or more cameras 1026 (e.g., monocular, stereoscopic, RGB, infrared, etc.).

Continuing with the discussion of elements from FIG. 10, the vehicle 1000 can include an input system 1030 that may be comprised of one or more ECUs connected with one or more TIDs in the rolling test bench. The input system 1030 generally encompasses one or more devices that enable the acquisition of information by a machine from an outside source, such as an operator. The input system 1030 can receive an input from a vehicle passenger (e.g., a driver/operator and/or a passenger). Additionally, in at least one configuration, the vehicle 1000 includes an output system 1035. The output system 1035 includes, for example, one or more devices that enable information/data to be provided to external targets (e.g., a person, a vehicle passenger, another vehicle, another electronic device, etc.).

Furthermore, the vehicle 1000 includes, in various arrangements, one or more vehicle systems 1040 that are comprised of various controllers (e.g., ECUs) and associated components. Various examples of the one or more vehicle systems 1040 are shown in FIG. 10. However, the vehicle 1000 can include a different arrangement of vehicle systems. It should be appreciated that although particular vehicle systems are separately defined, each or any of the systems or portions thereof may be otherwise combined or segregated via hardware and/or software within the vehicle 1000. As illustrated, the vehicle 1000 includes a propulsion system 1041, a braking system 1042, a steering system 1043, a throttle system 1044, a transmission system 1045, a signaling system 1046, and a navigation system 1047.

The navigation system 1047 can include one or more devices, applications, and/or combinations thereof to determine the geographic location of the vehicle 1000 and/or to determine a travel route for the vehicle 1000. The navigation system 1047 can include one or more mapping applications to determine a travel route for the vehicle 1000 according to, for example, the map data 1016. The navigation system 1047 may include or at least provide connection to a global positioning system, a local positioning system or a geolocation system.

In one or more configurations, the vehicle systems 1040 function cooperatively with other components of the vehicle 1000 and communicates with the other components via the wiring harness and associated communication networks enabled therein. For example, the processor(s) 1010, and/or automated driving module(s) 1060 can be operatively connected via the wiring harness to communicate with the various vehicle systems 1040 and/or individual components thereof. For example, the processor(s) 1010 and/or the automated driving module(s) 1060 can be in communication to send and/or receive information from the various vehicle systems 1040 to control the navigation and/or maneuvering of the vehicle 1000. The processor(s) 1010, and/or the automated driving module(s) 1060 may control some or all of these vehicle systems 1040.

For example, when operating in the autonomous mode, the processor(s) 1010 and/or the automated driving module(s) 1060 control the heading and speed of the vehicle 1000. The processor(s) 1010 and/or the automated driving module(s) 1060 cause the vehicle 1000 to accelerate (e.g., by increasing the supply of energy/fuel provided to a motor), decelerate (e.g., by applying brakes), and/or change direction (e.g., by steering the front two wheels). As used herein, "cause" or "causing" means to make, force, compel, direct, command, instruct, and/or enable an event or action to occur either in a direct or indirect manner.

As shown, the vehicle 1000 includes one or more actuators 1050 in at least one configuration. The actuators 1050 are, for example, elements operable to move and/or control a mechanism, such as one or more of the vehicle systems 1040 or components thereof responsive to electronic signals or other inputs from the processor(s) 1010, controllers, and/or the automated driving module(s) 1060. The one or more actuators 1050 may include motors, pneumatic actuators, hydraulic pistons, relays, solenoids, piezoelectric actuators, and/or another form of actuator that generates the desired control and which are, in at least one arrangement, connected with the various controllers via the wiring harness. Thus, within the rolling test bench, the ECUs for controlling the actuators may be connected via the TIDs/EIDs to the wiring harness to control the actuators.

As described previously, the vehicle 1000 can include one or more modules, at least some of which are described herein. In at least one arrangement, the modules are implemented as non-transitory computer-readable instructions that, when executed by the processor 1010, implement one or more of the various functions described herein. In various arrangements, one or more of the modules are a component of the processor(s) 1010, or one or more of the modules are executed on and/or distributed among other processing systems to which the processor(s) 1010 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an application-specific integrated circuit (ASIC), programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

Furthermore, the vehicle 1000 may include one or more automated driving modules 1060. The automated driving module(s) 1060, in at least one approach, receive data from the sensor system 1020 and/or other systems associated with the vehicle 1000. In one or more arrangements, the automated driving module(s) 1060 use such data to perceive a surrounding environment of the vehicle. The automated driving module(s) 1060 determine a position of the vehicle 1000 in the surrounding environment and map aspects of the surrounding environment. For example, the automated driving module(s) 1060 determines the location of obstacles or other environmental features including traffic signs, trees, shrubs, neighboring vehicles, pedestrians, etc.

The automated driving module(s) 1060 either independently or in combination with the interface system 100 can be configured to determine travel path(s), current autonomous driving maneuvers for the vehicle 1000, future autonomous driving maneuvers and/or modifications to current autonomous driving maneuvers based on data acquired by the sensor system 1020 and/or another source. In general, the automated driving module(s) 1060 functions to, for example, implement different levels of automation, including advanced driving assistance (ADAS) functions, semi-autonomous functions, and fully autonomous functions, as previously described.

Detailed embodiments are disclosed herein. However, it is to be understood that the disclosed embodiments are intended only as examples. Therefore, specific structural and functional details disclosed herein are not to be interpreted as limiting but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. The phrase "computer-readable storage medium" means a non-transitory storage medium. A computer-readable storage medium may be, for example, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system or device.

Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An interface system, comprising:

an endpoint interface device connected with a wire harness of a vehicle in place of a removed electronic control unit (ECU); and a test device connected with the endpoint interface device via a network to control a component of the vehicle attached to the network via the wire harness and the endpoint interface device, wherein the endpoint interface device facilitates dynamic reconfiguration of connections without modifying the wire harness.

2. The interface system of claim 1, wherein the test device is a virtual device emulated within a test computing device that is connected with the network to provide communications between the endpoint interface device and the virtual device, and wherein the test device emulates an electronic control unit of the vehicle.

3. The interface system of claim 1, further comprising:

a test interface device connected between the network and the test device, wherein the test interface device and the endpoint interface device are dynamically configurable to bridge connections with the test device and the component onto the network, including remapping connector pins of the wire harness at the test interface device to adapt to different test devices.

4. The interface system of claim 3, wherein the test interface device includes a memory storing configuration information about a mapping of the connector pins with a bridge, the connector pins connecting with pins of the test device, and wherein the endpoint interface device includes a memory storing configuration information about a mapping of connector pins with a bridge, the connector pins connecting with separate wires of the wire harness.

5. The interface system of claim 3, further comprising:

a control module, including instructions that, when executed by one or more processors, cause the one or more processors to dynamically configure connections via the network between test interface device and the endpoint interface device, including electronically reassigning the connector pins to accommodate the test device.

6. The interface system of claim 5, wherein the control module includes instructions to dynamically configure the connections including instructions to map pins of the endpoint interface device connected with individual wires of the wire harness to ports for communicating on the network via the endpoint interface device and to map pins of test interface device connected with pins of the test device to ports for communicating on the network via the test interface device, and wherein the control module includes instructions to generate separate mappings and to dynamically configure the separate mappings to change a configuration of the wire harness in the vehicle.

7. The interface system of claim 3, wherein the interface system includes multiple of the endpoint interface device to connect multiple of the test device within the vehicle via the network and associated test interface devices.

8. The interface system of claim 1, wherein the endpoint interface device is connected with the wire harness in place of an electronic control unit.

9. The interface system of claim 1, further comprising:

a control module, including instructions that, when executed by one or more processors, cause the one or more processors to log data provided onto the network, wherein the control module is located in at least the endpoint interface device.

10. The interface system of claim 9, wherein the control module includes the instructions to log the data including instructions to timestamp the data according to a master clock and replay the data according to timestamps including offsetting latencies of the network.

11. An apparatus, comprising:

an endpoint interface device connected with a wire harness of a vehicle in place of a removed electronic control unit (ECU);

a communication network connected with the endpoint interface device;

a test device connected to the communication network via a test interface device to control a component of the vehicle attached to the communication network via the endpoint interface device, wherein the endpoint interface device facilitates dynamic reconfiguration of connections without modifying the wire harness; and the test interface device connected between the communication network and the test device, wherein the test interface device and the endpoint interface device are dynamically configurable to bridge connections with the test device and the component onto the communication network.

12. The apparatus of claim 11, further comprising:

a virtual device that is emulated within a test computing device that is connected with the communication network, wherein the test device emulates an electronic control unit of the vehicle and connects with an associated component via the communication network.

13. The apparatus of claim 11, wherein the test interface device includes a memory storing configuration information about a mapping of connector pins with a bridge, the connector pins connecting with pins of the test device, and wherein the endpoint interface device includes a memory storing configuration information about a mapping of connector pins with a bridge, the connector pins connecting with separate wires of the wire harness.

14. The apparatus of claim 11, further comprising:

a control module, including instructions that, when executed by one or more processors, cause the one or more processors to dynamically configure connections via the communication network between test interface device and the endpoint interface device.

15. The apparatus of claim 14, wherein the control module includes instructions to dynamically configure the connections including instructions to map pins of the endpoint interface device connected with individual wires of the wire harness to ports for communicating on the communication network via the endpoint interface device and to map pins of test interface device connected with pins of the test device to ports for communicating on the communication network via the test interface device.

16. The apparatus of claim 14, wherein the control module including instructions to log data provided onto the communication network, and wherein the control module is located in at least the endpoint interface device.

17. The apparatus of claim 16, wherein the control module includes the instructions to log the data including instructions to timestamp the data according to a master clock and replay the data according to timestamps including offsetting latencies of the communication network.

18. The apparatus of claim 11, wherein the endpoint interface device is connected with the wire harness in place of an electronic control unit.

19. A rolling test bench, comprising:

an endpoint interface device connected with a wire harness of a vehicle in place of a removed electronic control unit (ECU);

a communication network connected with the endpoint interface device;

a test device connected to the communication network via a test interface device to control a component of the vehicle attached to the communication network via the endpoint interface device, wherein the endpoint interface device facilitates dynamic reconfiguration of connections without modifying the wire harness;

the test interface device connected between the communication network and the test device, wherein the test interface device and the endpoint interface device are dynamically configurable to bridge connections with the test device and the component onto the communication network; and a control module, including instructions that, when executed by one or more processors, cause the one or more processors to dynamically configure connections via the communication network between test interface device and the endpoint interface device.

20. The rolling test bench of claim 19, wherein the control module including instructions to log data provided onto the communication network and timestamp the data according to a master clock, and wherein the endpoint interface device is connected with the wire harness in place of an electronic control unit.

* * * * *